(12) United States Patent
Moynihan

(10) Patent No.: US 6,367,235 B1
(45) Date of Patent: Apr. 9, 2002

(54) BLADE-MOUNTING SYSTEM FOR A ROTARY MOWER

(76) Inventor: Harry L. Moynihan, 2855 W. Witney Rd., Selma, IN (US) 47383-9735

(*) Notice: Subject to any disclaimer, the term of this patent is extended or adjusted under 35 U.S.C. 154(b) by 0 days.

(21) Appl. No.: 09/561,801

(22) Filed: May 1, 2000

(51) Int. Cl.$^7$ ............................................. A01D 34/63
(52) U.S. Cl. ......................... 56/17.5; 56/12.7; 56/255; 56/DIG. 17; 464/901
(58) Field of Search ................................ 56/12.7, 14.7, 56/16.7, 17.5, 289, 255, 295, DIG. 9, DIG. 17, DIG. 20; 30/329, 337; 403/254, 255, 263; 464/901

(56) References Cited

U.S. PATENT DOCUMENTS

| | | | |
|---|---|---|---|
| 2,651,159 A | * 9/1953 | Rountree, Sr. | 56/295 |
| 2,854,807 A | * 10/1958 | Byler et al. | 56/295 |
| 3,589,112 A | * 6/1971 | Frohmader | 56/17.5 |
| 3,762,230 A | * 10/1973 | Steil et al. | 56/255 |
| 3,918,241 A | 11/1975 | Stillions | 56/12.7 |
| 4,037,389 A | * 7/1977 | Harkness | 56/11.3 |
| 4,229,933 A | 10/1980 | Bernard | 56/295 |
| 4,313,297 A | 2/1982 | Maier | 56/295 |
| 4,525,990 A | 7/1985 | Zweegers | 56/295 |
| 4,651,510 A | * 3/1987 | Malutich | 56/295 |
| 4,712,364 A | 12/1987 | Oxley | 56/295 |
| 4,771,593 A | * 9/1988 | Lee | 56/295 |
| 4,922,698 A | * 5/1990 | Taylor | 56/295 |
| 4,936,884 A | * 6/1990 | Campbell | 45/12.7 |
| 5,205,693 A | 4/1993 | Fuller et al. | 411/354 |
| 5,365,725 A | 11/1994 | McCance | 56/16.9 |
| 5,502,958 A | * 4/1996 | Plamper | 56/17.5 |
| 5,598,612 A | 2/1997 | Sheldon | 24/635 |
| 5,619,847 A | 4/1997 | Cox, Jr. | 56/255 |
| 5,622,035 A | 4/1997 | Kondo et al. | 56/12.7 |
| 5,782,073 A | 7/1998 | Sheldon | 56/17.5 |
| 5,890,354 A | * 4/1999 | Bednar | 56/255 |
| 5,946,895 A | * 9/1999 | Martens | 56/17.5 |

FOREIGN PATENT DOCUMENTS

GB 753094 * 7/1956 .................. 56/255

* cited by examiner

Primary Examiner—Thomas B. Will
Assistant Examiner—Nathan Mammen
(74) Attorney, Agent, or Firm—Bliss McGlynn & Nolan, PC

(57) ABSTRACT

A blade-mounting system for a rotary mower includes a platform operatively connected in driven relationship with a drive axle of the rotary mower. The platform includes a pair of raised edges spaced from one another and disposed on opposite sides of the platform and a plurality of upstanding lugs projecting from the platform and between the pair of edges with at least one of the upstanding lugs including a transverse hole extending through the lug. A blade is adapted to be disposed adjacent the platform and between the pair of raised edges. The blade includes apertures corresponding to the plurality of upstanding lugs such that the lugs are received through the apertures in the blade. A fastener is adapted to be received through the transverse hole in the at least one upstanding lug so as to removably mount the blade in adjacent relationship to the platform and between the pair of raised edges. The pair of raised edges and plurality of lugs cooperate to translate rotary motion from the drive axle of the mower to the blade.

14 Claims, 2 Drawing Sheets

BLADE-MOUNTING SYSTEM FOR A ROTARY MOWER

BACKGROUND OF THE INVENTION

1. Field of the Invention

The present invention relates, generally, to rotary mowers and, more specifically, to systems for mounting the blade to the drive axle of the rotary mower.

2. Description of the Related Art

A conventional blade-mounting, system for a rotary mower generally includes a cutting blade mounted to a drive axle, which extends from a mower deck and is rotatably powered by an internal-combustion engine or an electrical motor mounted to the deck. To this end, the axle may include a threaded bore, and the blade includes an aperture aligned with the bore. A fastening mechanism, such as a threaded bolt and washer, is inserted through the aperture and into the bore so as to mount the blade to the axle.

Because of the inherent danger presented by the rotating blade during operation of the mower, the bolt is usually tightened to a significant degree so as to ensure that the bolt does not come loose. However, the torque required to ensure safety also presents a substantial difficulty in removing the blade for purposes of sharpening or replacing the blade, cleaning, the mower deck, lubricating moving parts, etc. In particular, since mower decks have no locking, mechanism that holds the blade against rotation when the bolt is being loosened, the blade and axle freely move together in the direction of torque. This can be an impediment to loosening the bolt. And, even when a locking device, such as a block of wood, is improvised by the operator, there is the danger of stripping the head of the bolt in order to overcome the tightening torque used to mount the blade to the axle.

Thus, there remains a need in the art for a mower blade-mounting system that safely and securely mounts the blade to the drive axle, but facilitates easy removal of the blade for servicing or replacement purposes.

SUMMARY OF THE INVENTION

The deficiencies in the related art are overcome in a blade-mounting system for a rotary mower of the present invention. The rotary mower includes a platform operatively connected in driven relationship with a drive axle of the rotary mower. The platform includes a pair of raised edges spaced from one another and disposed on opposite sides of the platform. The platform also includes a plurality of upstanding lugs projecting from the platform and between the pair of edges with at least one of the upstanding lugs including a transverse hole extending through the lug. A blade is adapted to be disposed adjacent the platform and between the pair of raised edges. The blade includes apertures corresponding to the plurality of upstanding lugs such that the lugs are received through the apertures in the blade. A fastener is adapted to be received through the transverse hole in the at least one upstanding lug so as to removably mount the blade in adjacent relationship to the platform and between the pair of raised edges. The pair of raised edges and plurality of lugs cooperate to translate rotary motion from the drive axle of the mower to the blade.

One advantage of the blade-mounting system of the present invention is the dramatic increase in speed at which mower blades may be serviced or changed. Thus, the present invention finds particular use in the commercial mowing industry where blades are changed more frequently.

Another advantage of the blade-mounting system of the present invention is the absence of tools required to mount or dismount the blades to or from the system.

An additional advantage of the blade-mounting system of the present invention is the significant benefit for larger mowers, such as "brush hogs," with which it is quite difficult to loosen the larger sized bolts used to mount the conventional blades.

Other objects, features, and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
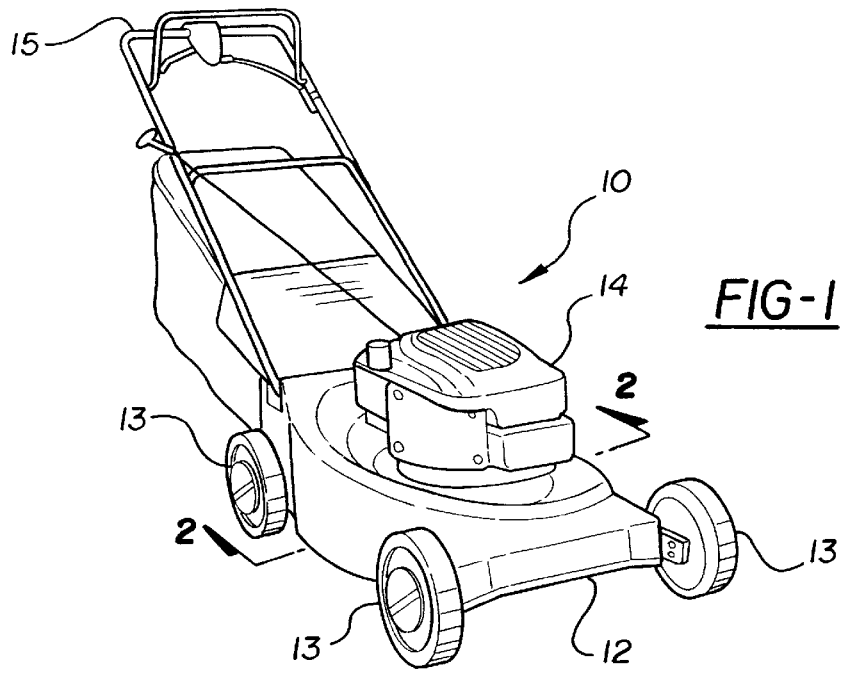
FIG. 1 is a perspective view of a rotary mower showing the deck, prime mover, wheels, and handle thereof.
Figure 2:
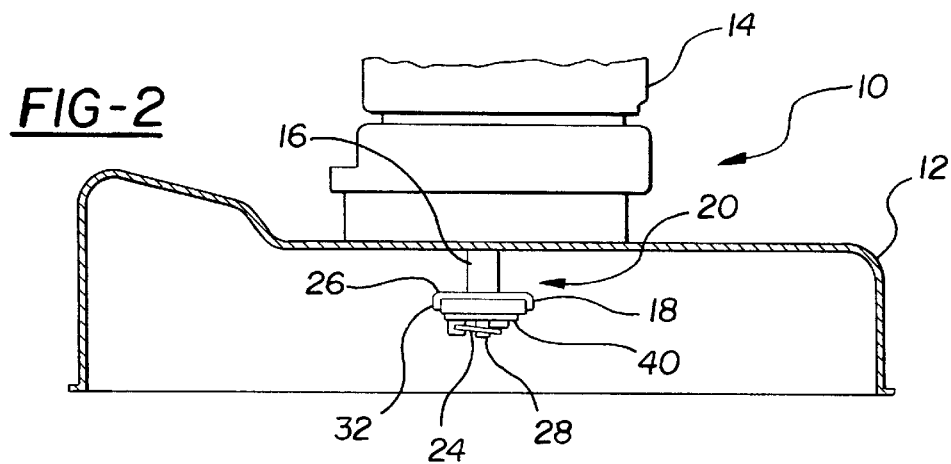
FIG. 2 is a cross-sectional side view of the preferred embodiment of the blade-mounting system of the present invention operatively disposed on a rotary mower showing the blade thereof in a plane perpendicular to the page.
Figure 3:
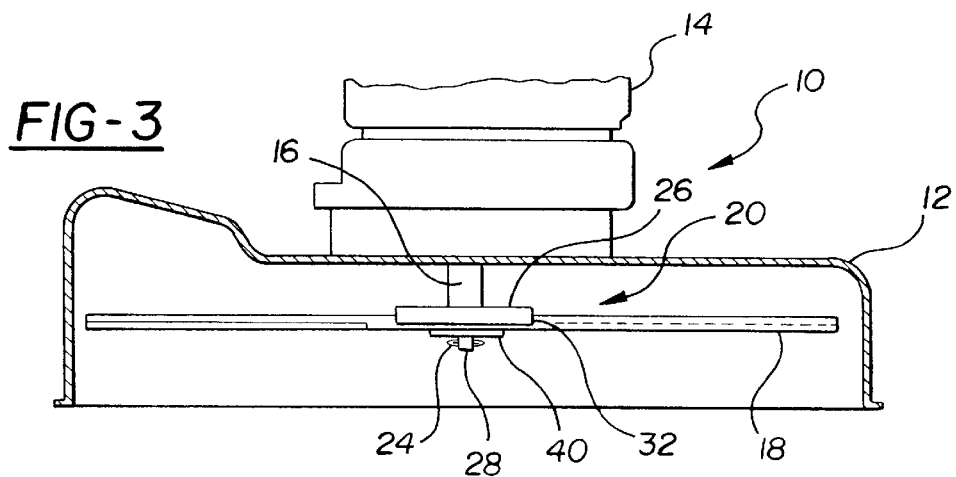
FIG. 3 is cross-sectional side view of the preferred embodiment of the blade-mounting system of the present invention operatively disposed on a rotary mower showing the blade thereof in a plane parallel with the page.

The subject invention overcomes the deficiencies in the related art in a zero-torque blade-mounting system of a rotary mower. The rotary mower, generally indicated at 10 in FIGS. 1 through 3, includes a mower deck 12 supported above the surface by wheels 13 and a handle 15 disposed substantially upwardly from the mower deck 12 as is conventionally known in the art. The rotary mower 10 further includes a prime mover 14 disposed adjacent the mower deck 12 and a drive axle 16 that may have a threaded bore (not shown) extending at least partially through the axle 16. The axle 16 is operatively coupled to and rotatingly driven by the prime mover 14. The rotary mower 10 also includes at least one blade 18 and the blade-mounting system 20 of the present invention operatively coupling the blade 18 to the drive axle 16. The rotary mower 10 illustrated in the drawings is a conventional "push-type" mower, but those having ordinary skill in the art will appreciate that the present invention is not limited to this specific type of rotary mower and that the present invention may be employed with any rotary mower.

The blade-mounting system is generally indicated at 20 in FIGS. 2 through 5 and is adapted for use with the axle 16. The system 20 includes a blade mount, generally indicated at 22 in FIGS. 4 and 5, and a fastener 24. The blade mount 22 includes a platform 26 and a threaded shaft 28 extending from the platform 26. In one embodiment, the shaft 28 is received in the threaded bore and threadably secured to the axle 16 in the same manner as a bolt of a conventional blade-mounting system. Alternatively, the shaft 28 may include a threaded bore (not shown) that receives a threaded stud (not shown) formed at the end of the drive axle 16. In any event, once secured to the axle 16, the blade mount 22 need not be removed as will be appreciated from the description that follows.

Figure 4:
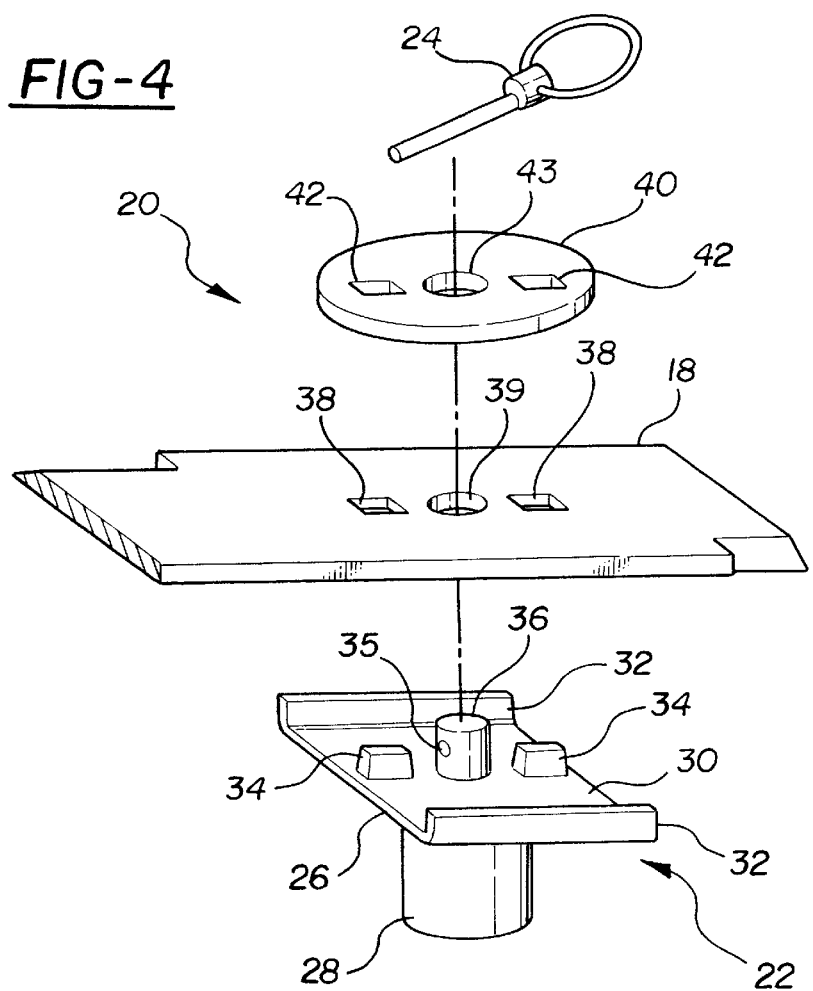
FIG. 4 is an exploded view of the preferred embodiment of the blade-mounting system of the present invention showing the structural relationship of the various elements of the system.

The platform 26 is operatively connected in driven relationship with the drive axle 16 of the rotary mower 10 and presents a mounting surface 30, as shown in FIG. 4, facing opposite the threaded shaft 28 upon which the cutting blade 18 may be supported. The platform 26 includes a pair of raised edges 32 spaced from one another and disposed on opposite sides of the platform 26. The platform 26 also includes a plurality of upstanding lugs 34, 36 projecting from the platform 26 and between the pair of edges 32 with at least one of the upstanding lugs 34, 36 having a transverse hole 35 extending through the lug 36.

The blade 18 is adapted to be disposed adjacent the platform 26 and between the pair of raised edges 32. To this end, the blade 18 includes apertures 38, 39 corresponding to the plurality of upstanding lugs 34, 36 such that the lugs 34, 36 are received through the apertures 38, 39 in the blade 18. The fastener 24 is adapted to be received through the transverse hole 35 in at least one of the upstanding lugs 34, 36 so as to removably mount the blade 18 in adjacent relationship to the platform 26 and between the pair of raised edges 32. The pair of raised edges 32 and plurality of lugs 34, 36 cooperate to translate rotary motion from the drive axle 16 of the mower 10 to the blade 18.

Figure 5:
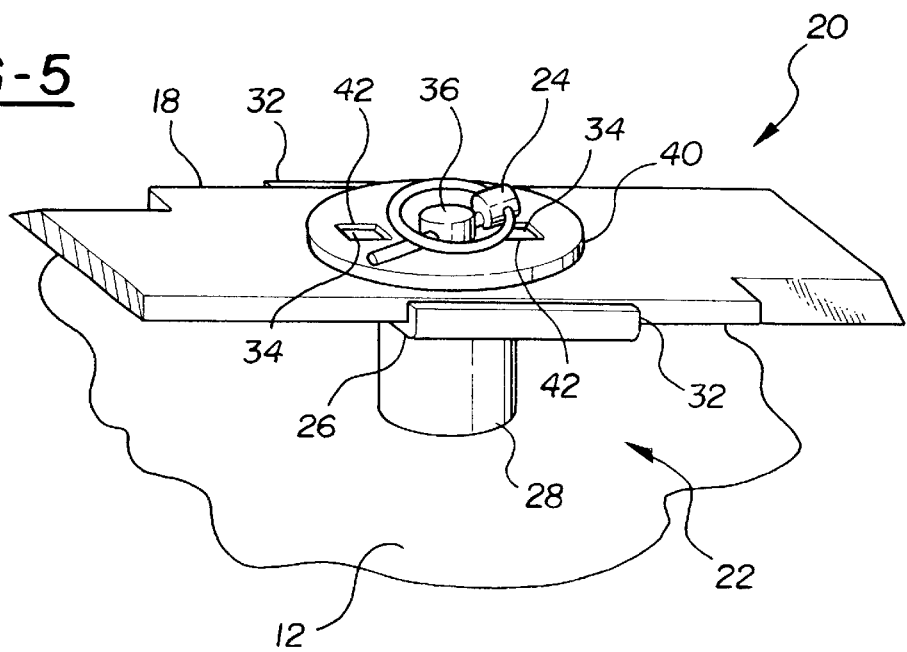
FIG. 5 is a perspective view of the preferred embodiment of the blade-mounting system of the present invention as assembled on a rotary mower.

In one preferred embodiment, as best shown in FIGS. 4 and 5, the pair of edges 32 are disposed parallel to one another along opposed sides of the platform 26 such that the pair of edges 32 engage either side of the blade 18 to impart rotary drive to the blade 18. The plurality of upstanding lugs include a pair of rectangularly shaped walls 34 disposed between the pair of edges 32 and extending in a direction substantially parallel with the pair of edges 32. The pair of rectangularly shaped walls 34 define a pair of longitudinal axes wherein the pair of longitudinal axes are coincident. The plurality of upstanding lugs also include a cylindrically shaped nipple 36 disposed between the pair of rectangularly shaped walls 34 and having the transverse hole 35. The nipple 36 is disposed coincident to both of the longitudinal axes of the rectangularly shaped walls 34.

In the preferred embodiment, the blade 18 includes apertures 38, 39 that are shaped to cooperatively receive the rectangularly shaped walls 34 and cylindrically shaped nipple 36, respectively, such that the walls 34 and nipple 36 impart torque from the drive axle 16 of the rotary mower 10 to the blade 18. A washer 40 is disposed between the blade 18 and the fastener 24 such that the washer 40 is supported on the blade 18. The washer 40 also includes apertures 42, 43 corresponding to the rectangularly shaped walls 34 and cylindrical nipple 36, respectively, such that the rectangularly shaped walls 34 and nipple 36 are received through the apertures 42, 43 in the washer 40. In the preferred embodiment, the fastener 24 is a cotter pin adapted to be removably received in the transverse hole 35 and, thereby, removably fasten the blade 18 to the platform 26. However, those having ordinary skill in the art will appreciate that the fastener 24 may include any device that may be quickly engaged and disengaged to mount the blade 18 to the platform 26.

In operation, torque from the axle 16 is translated to the blade 18 through the pair of raised edges 32 and the plurality of upstanding lugs 34. The fastener 24 secures the blade 18 to the platform 26 as the blade 18 rotates. However, when the mower 10 is not in use, the blade 18 may be quickly removed for sharpening or replacement of the blade 18, cleaning of the mower deck 12, lubrication of moving parts, etc. by simply pulling out the fastener 24. Once the mower 10 is serviced, the blade 18 is secured to the platform 26 via the fastener 24.

The blade-mounting system of the present invention dramatically increases the speed with which mower blades may be serviced or changed. No tools are required. The blade-mounting system of the present invention would be particularly helpful for the commercial mowing industry where blades are changed more frequently. In addition, the blade-mounting system of the present invention presents significant advantages for larger mowers, such as "brush hogs," with which it is quite difficult to loosen the larger sized bolts used to mount the conventional blades.

The invention has been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

I claim:

1. A blade-mounting system for a rotary mower, said system comprising:

a platform operatively connected in driven relationship with a drive axle of the rotary mower, said platform including a pair of raised parallel edges spaced from one another and disposed on opposite sides of said platform and a plurality of upstanding lugs projecting from said platform and between said pair of edges, said plurality of upstanding lugs including a pair of walls disposed between said pair of raised, parallel edges and extending in a direction substantially parallel with said pair of edges at least one of said upstanding lugs including a transverse hole extending through said lug;

a blade adapted to be disposed adjacent said platform and between said pair of raised, parallel edges such that said pair of raised edges engage either side of said blade, said blade including apertures that are shaped to cooperatively receive and abut said walls of said plurality of upstanding lugs so as to impart torque from the drive axle of the rotary mower to said blade; and a fastener adapted to be received through said transverse hole in said at least one upstanding lug so as to removably mount said blade in adjacent relationship to said platform and between said pair of raised edges, said pair of raised edges and said plurality of lugs cooperating to translate rotary motion from the drive axle of the mower to said blade.

2. A blade-mounting system as set forth in claim 1, wherein said blade-mounting system further includes a washer disposed between said blade and said fastener.

3. A blade-mounting system as set fort h in claim 2, wherein said washer includes apertures corresponding to said plurality of upstanding lugs such that said lugs are received through said apertures in said washer.

4. A blade-mounting system as set forth in claim 1, wherein at least one of said pair of walls of said upstanding lugs is rectangularly shaped and defines a pair of longitudinal axes and wherein said pair of longitudinal axes are coincident.

5. A blade-mounting system as set forth in claim 4, wherein said plurality of upstanding lugs include a nipple disposed between said pair of rectangularly shaped walls, said nipple including said transverse hole.

6. A blade-mounting system as set forth in claim 5, wherein said nipple is disposed coincident to both of said longitudinal axes of said rectangularly shaped walls.

7. A blade-mounting system as set forth in claim 1, wherein said fastener is a cotter pin adapted to be removably received in said transverse hole and, thereby, removably fasten said blade to said platform.

8. A rotary mower comprising:

a mower deck, a prime mover, a drive axle operatively coupled to said prime mover and rotatingly driven thereby, at least one blade, and a blade-mounting system operatively coupling said blade to said drive axle;

said blade-mounting system including a platform operatively connected in driven relationship with a drive axle of the rotary mower, said platform including a pair of raised parallel edges spaced from one another and disposed on opposite sides of said platform and a plurality of upstanding lugs projecting from said platform and between said pair of edges, said plurality of upstanding lugs including a pair of walls disposed between said pair of raised, parallel edges and extending in a direction substantially parallel with said pair of edges, at least one of said upstanding lugs including a transverse hole extending through said lug;

said blade adapted to be disposed adjacent said platform and between said pair of raised, parallel edges such that said pair of raised edges engage either side of said blade, said blade including apertures that are shaped to cooperatively receive and abut said walls of said plurality of upstanding lugs so as to impart torque from the drive axle of the rotary mower to said blade; and a fastener adapted to be received through said transverse hole in said at least one upstanding lug so as to removably mount said blade in adjacent relationship to said platform and between said pair of raised edges, said pair of raised edges and said plurality of lugs cooperating to translate rotary motion from said drive axle of said mower to said blade.

9. A rotary mower as set forth in claim 8, wherein said blade-mounting system further includes a washer disposed between said blade and said fastener.

10. A rotary mower as set forth in claim 9, wherein said washer includes apertures corresponding to said plurality of upstanding lugs such that said lugs are received through said apertures in said washer.

11. A rotary mower as set forth in claim 8, wherein at least one of said pair of walls of said upstanding lugs is rectangularly shaped and defines a pair of longitudinal axes and wherein said pair of longitudinal axes are coincident.

12. A rotary mower as set forth in claim 11, wherein said plurality of upstanding lugs include a nipple disposed between said pair of rectangularly shaped walls, said nipple including said transverse hole.

13. A rotary mower as set forth in claim 12, wherein said nipple is disposed coincident to both of said longitudinal axes of said rectangularly shaped walls.

14. A rotary mower as set forth in claim 8, wherein said fastener is a cotter pin adapted to be removably received in said transverse hole and, thereby, removably fasten said blade to said platform.

* * * * *